(12) United States Patent
Wolfe (10) Patent No.: US 7,838,134 B2
(45) Date of Patent: Nov. 23, 2010

(54) DURABLE SILVER MIRROR WITH ULTRA-VIOLET THRU FAR INFRA-RED REFLECTION

(75) Inventor: Jesse D. Wolfe, Discovery Bay, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 494 days.

(21) Appl. No.: 11/286,368

(22) Filed: Nov. 23, 2005

(65) Prior Publication Data

US 2006/0141272 A1    Jun. 29, 2006

Related U.S. Application Data

(60) Provisional application No. 60/630,852, filed on Nov. 23, 2004.

(51) Int. Cl.
B05D 1/36    (2006.01)
B32B 9/04    (2006.01)

(52) U.S. Cl. .................. 428/701; 428/699; 428/702; 427/258; 427/404; 427/419.3

(58) Field of Classification Search .............. 359/360, 359/584, 585, 884; 428/623, 699, 701, 702; 427/258, 404, 419.3
See application file for complete search history.

(56) References Cited

U.S. PATENT DOCUMENTS

| | | | |
|---|---|---|---|
| 4,234,654 A * | 11/1980 | Yatabe et al. ............... 428/333 |
| 4,643,518 A | 2/1987 | Taniguchi | |
| 4,645,714 A | 2/1987 | Roche et al. | |
| 5,019,458 A | 5/1991 | Elgat et al. | |
| 5,216,551 A | 6/1993 | Fujii | |
| 5,377,045 A | 12/1994 | Wolfe et al. | |
| 5,424,876 A | 6/1995 | Fujii | |
| 5,548,440 A | 8/1996 | Hohenegger | |
| 5,563,734 A | 10/1996 | Wolfe et al. | |
| 6,078,425 A * | 6/2000 | Wolfe et al. ................. 359/584 |
| 6,562,471 B1 | 5/2003 | Martin et al. | |

(Continued)

FOREIGN PATENT DOCUMENTS

JP    62258778 A2    11/1987

(Continued)

OTHER PUBLICATIONS

Mackova et al., acta physica slovaca, vol. 54 No. 1, p. 7-10, http://147.213.69/actaps/acta04/7.pdf, published Jan. 2004.*

(Continued)

*Primary Examiner*—Jennifer C McNeil
*Assistant Examiner*—Lauren Robinson
(74) *Attorney, Agent, or Firm*—James S. Tak (57) ABSTRACT

A durable highly reflective silver mirror characterized by high reflectance in a broad spectral range of about 300 nm in the UV to the far infrared (~10000 nm), as well as exceptional environmental durability. A high absorptivity metal underlayer is used which prevents the formation of a galvanic cell with a silver layer while increasing the reflectance of the silver layer. Environmentally durable overcoat layers are provided to enhance mechanical and chemical durability and protect the silver layer from corrosion and tarnishing, for use in a wide variety of surroundings or climates, including harsh or extreme environments.

13 Claims, 11 Drawing Sheets

U.S. PATENT DOCUMENTS

2002/0187350 A1    12/2002    Saccomanno et al.
2004/0089535 A1*    5/2004    Wolfe et al. ............ 204/192.12

FOREIGN PATENT DOCUMENTS

| | | |
|---|---|---|
| JP | 07047142 B4 | 2/1995 |
| JP | 09189803 A2 | 7/1997 |
| JP | 11018894 A2 | 1/1999 |
| JP | 2004037295 A2 | 2/2004 |
| JP | 2004158495 A2 | 6/2004 |
| WO | WO 00/07818 A1 | 2/2000 |
| WO | WO 01/02773 A1 | 1/2001 |

OTHER PUBLICATIONS

Kwon et al. 1 (Content of the technical papers presented at the 1993 Symposium on VLSI Technology uploaded in IEEE Xplore) http://ieeexplore.ieee.org/xpl/tocresultprintf.jsp?isnumber=16441&ResultStart=0.*

Kwon et al. 2 ("Ta2O5/TiO2 Composite Films for High Density DRAM Capacitors". Advanced Technology Center, Samsung Electronics Co. Ltd. ).*

Willey. "Practical Design and Production of Optical Thin Films" 2002, pp. 294-295.*

Wolfe et al, *Deposition of Durable Wide-Band Silver Mirror Coating using Long Throw, Low Pressure, DC Pulsed Magnetron Sputtering*. Jul. 25, 2002.

Wolfe et al, *High Reflectivity of Silver Extended Down to 200 NM*. Jun. 4, 2001.

Wolfe et al, *UV-Shifted Durable Silver Coating for Astronomical Mirror*. Jun. 1, 2000.

Wolfe et al, *Strategy for Successfully Coating a 22" Diameter Mirror for the Keck Telescope with Durable Silver using 6" Sputter Cathodes*. Jul. 2001.

Thomas et al, *Protected Silver Coatings for Flashlamp-Pumped Nd: Glass Amplifiers*, 39th Annual Symposium on Optical Materials for High Power Lasers, Boulder, CO, Sep. 28-Oct. 1, 1998.

Thomas et al, *Prevention of Corrosion of Silver Reflectors for the National Ignition Facility*, SPIE International Symposium on Optical Science, Engineering & Instrumentation, San Diego, CA, Jul. 19-24, 1998.

Thomas et al, *Protected Silver Coating for Astronomical Mirrors*, SPIE Astronomical and Instrumentation Symposium, vol. 3352, 1998, pp. 580-586.

Braun et al, *Multi-Component EUV Multilayer Mirrors*. Emerging Lithographic Technologies VII. Proceedings of SPIE, vol. 5037 (2003).

* cited by examiner

DURABLE SILVER MIRROR WITH ULTRA-VIOLET THRU FAR INFRA-RED REFLECTION

I. CLAIM OF PRIORITY IN PROVISIONAL APPLICATION

This application claims priority in provisional application No. 60/630,852 filed on Nov. 23, 2004, entitled "Durable Silver Mirror with Ultra-Violet Reflection," by Jesse Dennis Wolfe.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to mirrors, and in particular to a durable silver mirror multilayer having a stack of overcoat layers reflective in the low reflectance gap range (300-400 nm) of silver, and an absorbing metal underlayer which prevents the formation of a galvanic cell with silver, so as to enable high reflectance over a wide spectral range from about 300 nm in the ultra-violet (UV) region to the far infrared, while improving environmental durability.

III. BACKGROUND OF THE INVENTION

Silver is known to have the highest reflectance of all of the metals in the wavelength range from about 400 nm through the far infrared. But below about 400 nm the reflectance of silver drops to a minimum at about 320 nm due to optical constants and surface plasmon resonance (see FIG. 3). Because of this low reflectance gap in the 300-400 nm wavelength range, silver metal is typically used only in mirror applications requiring high reflectance down to 400 nm, but not for reflecting in the UV part of the spectrum. Other mirror applications exist, however, which require high reflectance over a wider spectral range than capable by ordinary silver, such as from about 300 nm in the UV to the far infrared regions (~10000 nm), characterized herein as broadband. Such high reflectance broadband mirrors are important, for example, in astronomical instruments/applications because it maximizes the efficiency over a wide band of wavelengths of interest to astronomical science. For terrestrial mirror instruments and applications in particular, the earth's atmosphere absorbs all UV wavelengths of light below about 280-300 nm, i.e. the cutoff for atmospheric transmission. As such, broadband high reflectance from about 300-10000 nm would enable the reflection of substantially all terrestrially present wavelength ranges.

Furthermore, silver tends to be very soft mechanically and easily abraded, as well as susceptible to tarnishing and corrosion over time from ordinary atmospheric contaminants/conditions, such as by reacting with, for example, oxygen, chlorine, sulfur, and ozone. Because of this silver coatings are often not used in optical mirror systems unless suitably protected from the elements.

U.S. Pat. No. 6,078,425 issued to the Applicant (Wolfe) shows one example of an environmentally durable high reflectance silver mirror for broadband reflection in the range 300-10000 nm. In the '425 patent, aluminum is used for its high reflectance in the UV portion of the spectrum, and a thin layer (350 Å) of silver is placed on top of it. The low reflectance limitation of silver below 400 nm is compensated by the aluminum layer which is highly reflective down to 200 nm in the UV region, while the silver layer compensates for a dip in reflectance of aluminum at 850 nm caused by inter-band transitions. In this manner, aluminum works optically with silver to increase and widen the high reflectance range. Additionally, a stack of durability layers using, for example, metal oxides, operate to protect the silver layer from the elements.

One problem, however, with the arrangement of the '425 patent is that aluminum and silver metals in contact with each other tend to form a galvanic cell, due to the electrolytic effect, and cause deterioration of the coating, especially if pinholes are present in the coating. While placing a NiCrN$_x$ layer between the aluminum and silver may help slow down the electrolytic effect and the resulting degradation, long term testing (e.g. about 7 months) conducted by the Applicant in work performed for the Lawrence Livermore National Laboratory, has shown that the degradation of the silver layer continues, especially when pinholes are present.

There is therefore a need for a high reflectance silver mirror over a wide bandwidth, such as from about 300 nm in the UV to about 10000 nm in the far infrared, to maximize optical throughput, and without utilizing aluminum to achieve the increased bandwidth, so as to void forming a galvanic cell. Furthermore, it is also desirable to provide protective barrier layers which help resist corrosion and tarnishing from environmental contaminants or humidity, and are mechanically durable and robust to withstand, for example, the 20 rub eraser test.

IV. SUMMARY OF THE INVENTION

One aspect of the present invention includes a reflective mirror having high reflectance over a large spectral range, comprising: a substrate comprising an absorbent metal layer on at least a surface thereof, said absorbent metal layer comprising at least one of tungsten, tantalum, nickel, chromium and alloys thereof; an adhesion layer deposited on the absorbent metal layer, said adhesion layer comprising a material selected from the group consisting of nickel, nickel nitride, chromium, chromium nitride, nickel-chromium alloys, and nickel-chromium nitride; a reflective silver layer deposited on the adhesion layer so that light transmitted through the silver layer is absorbed by the absorbent metal layer to increase the reflection of the silver layer at all wavelengths; a passivation layer deposited on the silver layer, comprising a material selected from the group consisting of nickel, nickel nitride, chromium, chromium nitride, nickel-chromium alloys, and nickel-chromium nitride; a nitride layer deposited on the passivation layer; and a plurality stack of metal oxide layers deposited on the nitride layer.

Another aspect of the present invention includes a method for forming a reflective mirror having high reflectance over a large spectral range, comprising: providing a substrate comprising an absorbent metal layer on at least a surface thereof, said absorbent metal layer comprising at least one of tungsten, tantalum, nickel, chromium, and alloys thereof; forming an adhesion layer on the absorbent metal layer, said adhesion layer comprising a material selected from the group consisting of nickel, nickel nitride, chromium, chromium nitride, nickel-chromium alloys, and nickel-chromium nitride; forming a reflective silver layer on the adhesion layer so that light transmitted through the silver layer is absorbed by the absorbent metal layer to increase the reflection of the silver layer at all wavelengths; forming a passivation layer on the silver layer, comprising a material selected from the group consisting of nickel, nickel nitride, chromium, chromium nitride, nickel-chromium alloys, and nickel-chromium nitride; forming a nitride layer on the passivation layer; and forming a plurality stack of metal oxide layers on the nitride layer.

Another aspect of the present invention includes a reflective mirror having high reflectance over a large spectral range, comprising: a substrate; a reflective coating deposited on the substrate; and a plurality stack of metal oxide layers deposited on the nitride layer, said plurality stack of metal oxide layers including: a first metal oxide layer selected from the group consisting of $SiO_2$ and $Al_2O_3$ deposited on the nitride layer, a $TiO_2$ layer deposited on the first metal oxide layer; and a plurality of split layers deposited on the $TiO_2$ layer, each split layer selected from the group consisting of $(SiO2/TaO_x)$ SiO2 and $(Al_2O_3/TaO_x) Al_2O_3$.

Generally, the present invention is directed to a durable highly reflective silver mirror that is characterized by high reflectance in the broad spectral range of about 300 nm in the UV to the far infrared (~10000 nm), as well as exceptional environmental durability. A high absorptivity metal underlayer is used which prevents galvanization with a silver layer while increasing the reflectance of the silver layer. The metal underlayer, such as for example tantalum, tungsten, nickel, chrome, etc., renders the coating highly reflective from about 300 nm in the UV to the far infrared, without the galvanic cell deterioration observed when aluminum is used as the underlayer. Additionally durable overcoat layers are used to protect the silver layer from corrosion and tarnishing, as well as produce a mirror that is very hard, durable, and resistant to atmospheric contaminants, abrasion, immersion in acid baths, and cosmic radiation or dust. As such, the durable silver mirror of the present invention can be used in a wide variety of surroundings or climates, or designed for a particularly harsh or extreme environment (e.g., high humidity, outer space, volcanically active areas, marine areas, or the desert). The combination of a metal underlayer (of a type substantially resistant to galvanic cell formation with silver), a silver metal layer, and durable overcoat layers produces the high reflectance over a large spectral range of wavelengths from 300-10000 nm, which covers ultraviolet, visible, and infrared light.

The present invention could also be used for laser reflectors, facsimile machines, projection television screens, telescope mirrors, or in any device that requires a highly reflective surface in the ultraviolet, visible, and infrared wavelength regions. In particular, the present invention is especially suitable for telescopic mirror applications where exposure to the elements is common. Other objects and advantages of the present invention will become apparent from the following description and accompanying drawings.

V. BRIEF DESCRIPTION OF THE DRAWINGS

The accompanying drawings, which are incorporated into and form a part of the disclosure, are as follows.

VI. DETAILED DESCRIPTION

Generally, the present invention relates to a durable silver mirror/thin-film coating, which has high reflectance over a wide spectral region of infrared, visible, and ultraviolet light, from about 300 nm in the UV to about 10000 nm in the far infrared, without the use of an aluminum layer as described in U.S. Pat. No. 6,078,425. The term "high reflectance" used herein in and in the claims means greater than about 90% reflectance. The durable silver mirror, thin film coating also possesses advanced environmental durability (e.g. mechanical and chemical) as will be described in greater detail herein.

Figure 1:
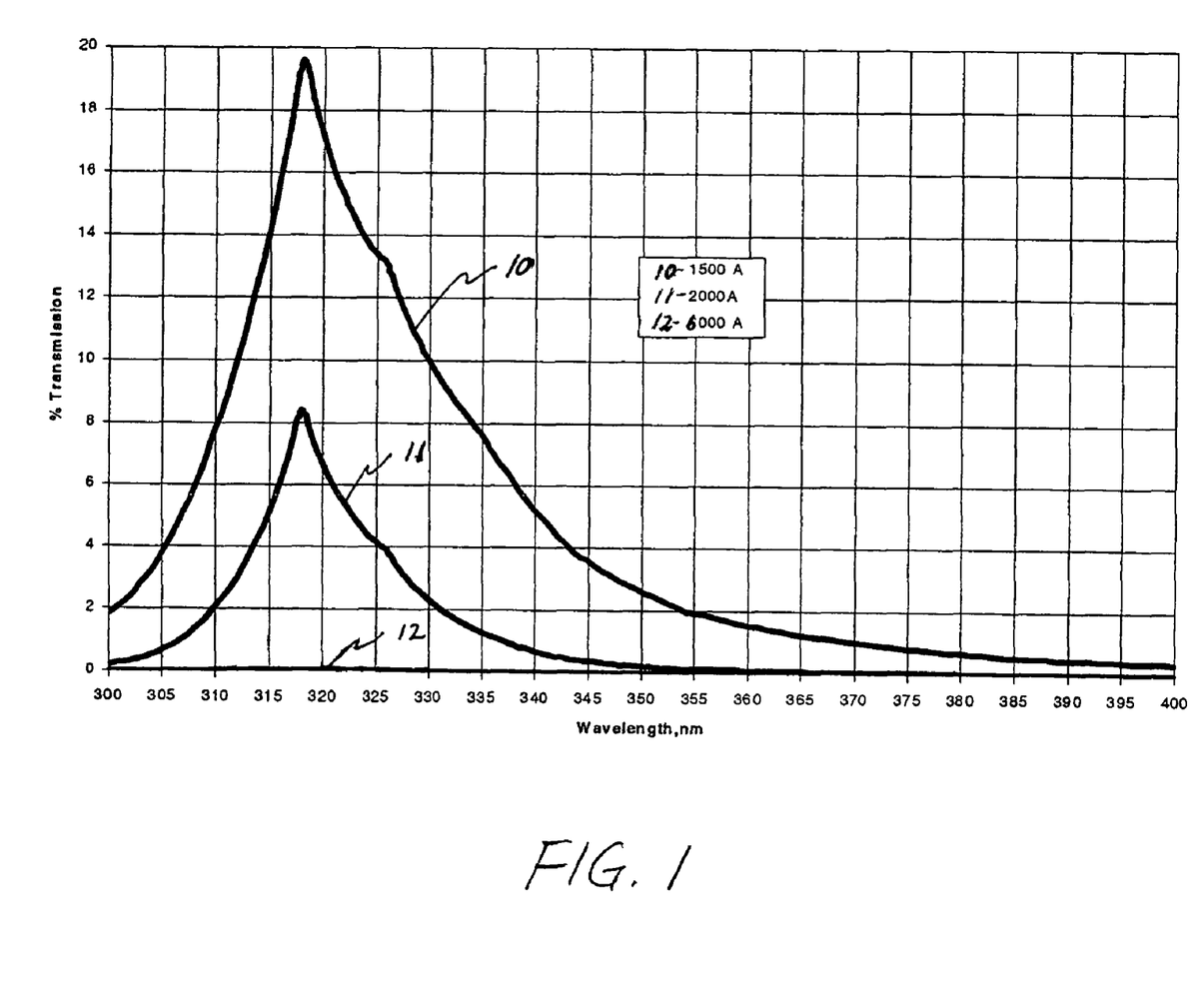
FIG. 1 is a graph showing the percentage transmission of silver film at three representative thicknesses over the wavelength range 300-400 nm
Figure 2:
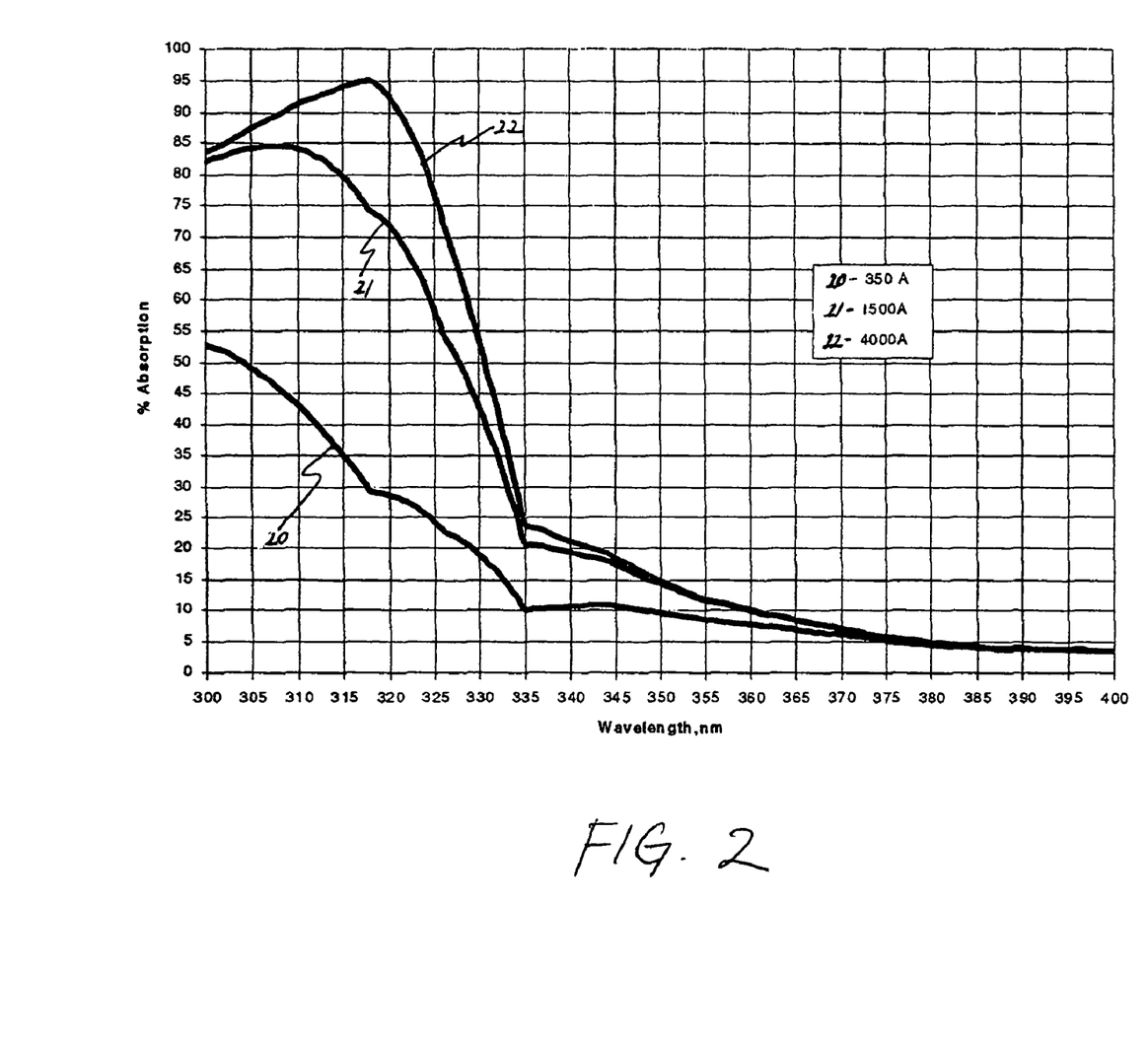
FIG. 2 is a graph showing the percentage absorption of silver film at three representative thicknesses over the wavelength range 300-400 nm.
Figure 3:
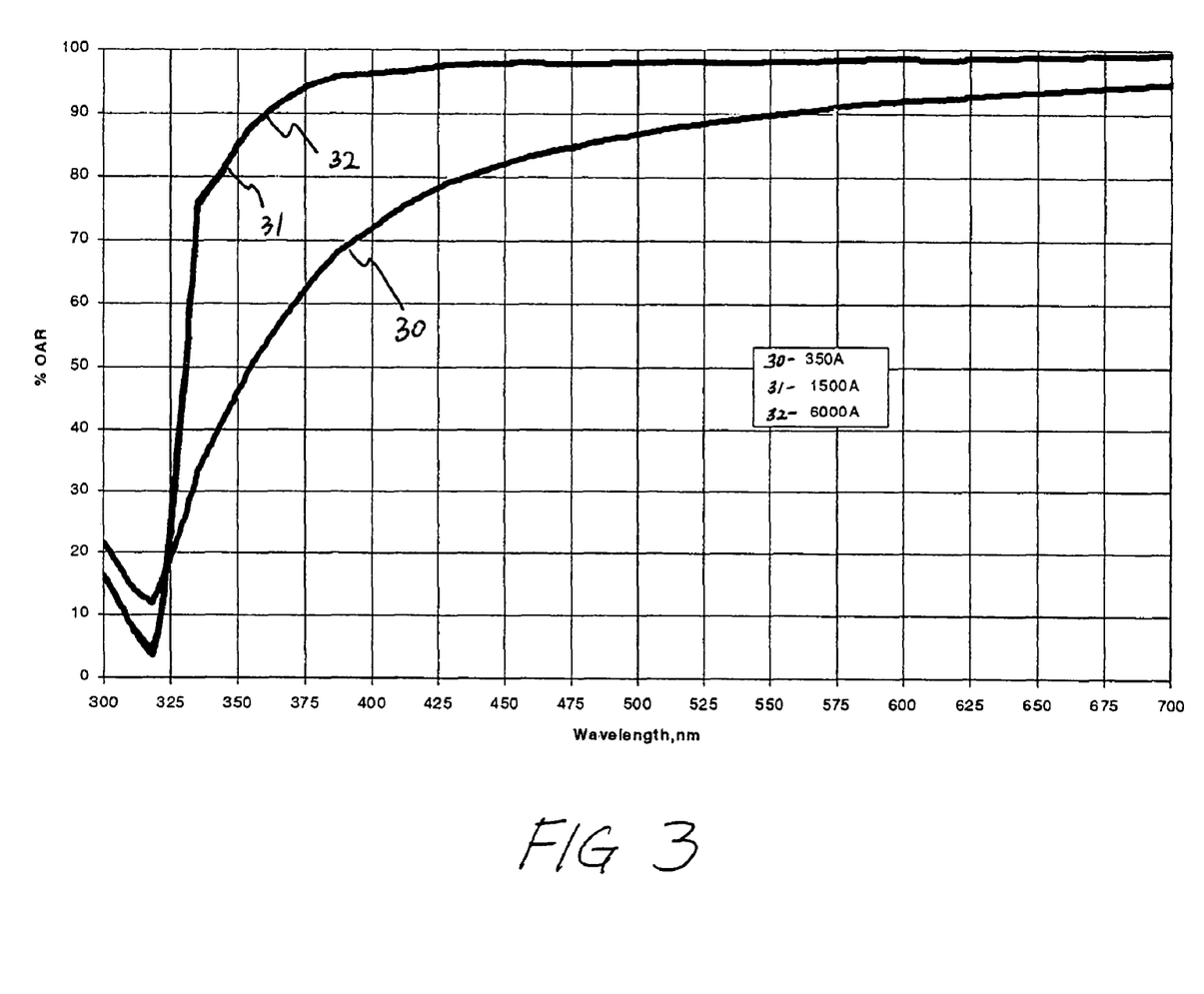
FIG. 3 is a graph showing the percentage reflection of silver film at three representative thicknesses over the wavelength range 300-700 nm.

FIGS. 1-3 graph the percentage transmission, absorption, and reflection of silver at various sample thicknesses to illustrate the importance of silver layer thickness when working in the 300-400 nm wavelength range. As shown in FIG. 1, light transmission at about 318 nm wavelength is about 20% for 1500 angstrom (Å) thick silver 10, about 8% for 2000 Å thick silver 11, and zero for 6000 Å thick silver 12. Thus, it can be seen that percentage transmission increases as the silver thickness decreases. But as shown in FIG. 2, as the silver thickness decreases, percentage absorption also decreases. For example, light absorption at 320 nm wavelength is about 28% for 350 Å thick silver 20, about 72% for 1500 Å thick silver 21, and about 92% for 4000 Å thick silver 22. FIG. 2 shows how absorption increases dramatically from about 4% at 400 nm to about 92% or so at about 320 nm for a silver layer greater than 2500 A. And FIG. 3 shows percentage reflection for three representative silver layer thicknesses: 350 Å indicated at 30, 1500 Å indicated at 31, and 6000 Å indicated at 32.

It can be seen from FIG. 1 that percentage transmission increases as the silver thickness decreases, and conversely, that the percentage transmission approximates zero transmission as the silver thickness increases. In particular, an extrapolation of the graph in FIG. 2 suggests that if the silver thickness is less than about 2500 Å, it will transmit light (i.e. overcome zero transmission) at 320 nm in the UV. However, the transmission leakage at 320 nm for thicknesses less than 2500 Å is not necessarily obvious since even with the transmission leakage, silver thicknesses less than 2500 have as good a reflectance as silver thicknesses greater than 3000 Å having no transmission leakage. For example, a comparison of FIGS. 1 and 3 shows that despite the transmission leak of about 20% at about 320 nm for 1500 Å thick silver layer 10, its reflection 32 is approximately the same as the reflection of a 6000 Å thick silver layer 31 that has no transmission leak 12. Therefore, despite the transmission leak at about 320 nm, it is important to select a suitably thin silver layer (e.g. 1500 Å) so as to decrease absorption, while also having reflectivity that is comparable to thicker silver layers (e.g. 6000 Å). Therefore, the silver layer thickness in a preferred embodiment of the durable silver mirror of the present invention is selected to be about 500-1500 Å.

To allow the use of such thin silver layers below about 1500 Å, the present invention utilizes an environmentally durable metal underlayer having high absorptivity in the UV-visible region of the spectrum to eliminate the transmission of light through the silver layer, even for very thin silver thicknesses (such as for example 350 Å), and increase the reflection of the silver at all wavelengths. This allows the silver to be deposited or otherwise formed as a thinner layer thickness, which also promotes and improves the mechanical durability of the mirror as determined, for example, by its ability to pass the 20 rub eraser test. Silver thicknesses greater than 3000 Å are known to affect the mechanical hardiness of the silver layer, and consequently its ability to pass the 20 rub eraser test.

Additionally, the metal underlayer is of a type which substantially reduces or eliminates the formation of a galvanic cell with silver which causes deterioration of the coating, especially if there are pinholes present in the coating. When dissimilar metals are joined, an electric potential is developed at the interface between the metals. The magnitude of the potential is determined by the difference between the electrode potentials of the two metals in the familiar electromotive force series of the elements (EMF series). If at the same time, the different in potential is large, and an electrolyte (e.g. water) reaches the interface (e.g. by grain boundary diffusion) and the more base metal (anode) of the couple is anodizable, that metal will be anodized (oxidized), resulting in a high interface contact resistance and/or mechanical failure of the interface.

Thus, the metal underlayer is preferably of a type having high absorptivity in the UV-visible region of the spectrum and known to produce minimal electric potential when joined with silver, such as tungsten, tantalum, nickel, chrome, or alloys of these metals. Additionally, the metal underlayer preferably has a thickness between 800-2000 Å. Aluminum by itself or even with thin (e.g. 3 Å) $NiCrN_x$ layers as shown by the '425 patent, can still form a galvanic cell with silver if pinholes are present. Table 1 shows the Emf volts of various materials indicating their respective proclivity to galvanize with silver.

TABLE 1

| Material | Emf Volts |
|---|---|
| Aluminum | −1.70 |
| Titanium | −1.63 |
| Tantalum | −0.81 |
| Chromium | −0.41 |
| Nickel | −0.25 |
| Tungsten | −0.09 |
| Silver | +0.7996 |

Figure 4:
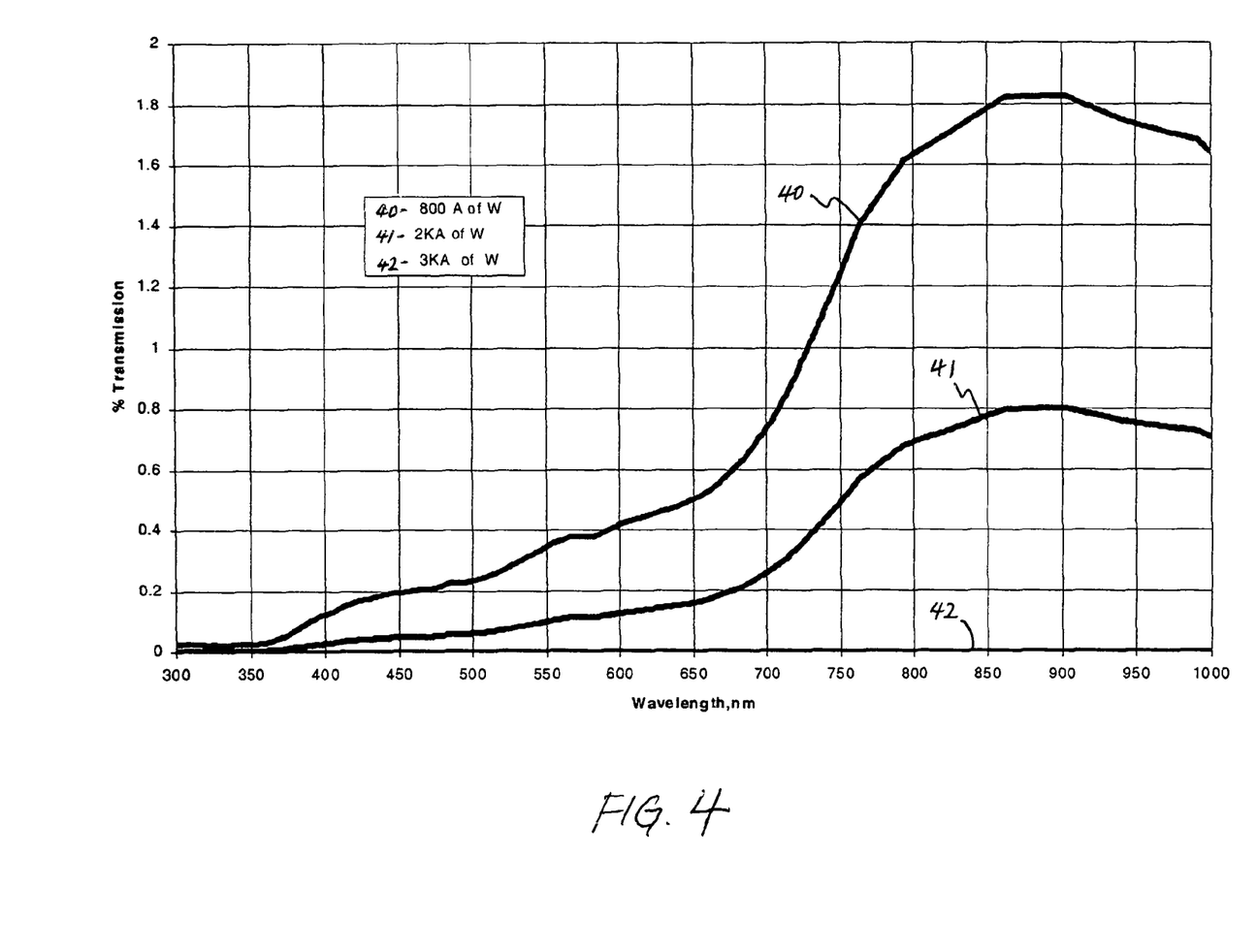
FIG. 4 is a graph showing the percentage transmission of Tungsten film at three representative thicknesses over the wavelength range 300-1000 nm.

Tungsten, in particular is known to have excellent corrosion resistance and is attacked only slightly by most mineral acids. It also has good adhesive properties. FIG. 4 shows a graph of the percentage reflection of tungsten for three representative thicknesses: 800 Å at 40, 2000 Å at 41, and 3000 Å at 42. As can be seen, the percentage transmission for all three thicknesses approaches zero transmission in the 300-350 nm range. The thermal expansion of tungsten is also about the same as boro-silicate glass, which makes the metal useful for glass to metal seals. In any case, the metal underlayer is preferably the first layer deposited on a substrate, or otherwise formed to comprise a surface of the substrate (e.g. via doping).

Figure 5:
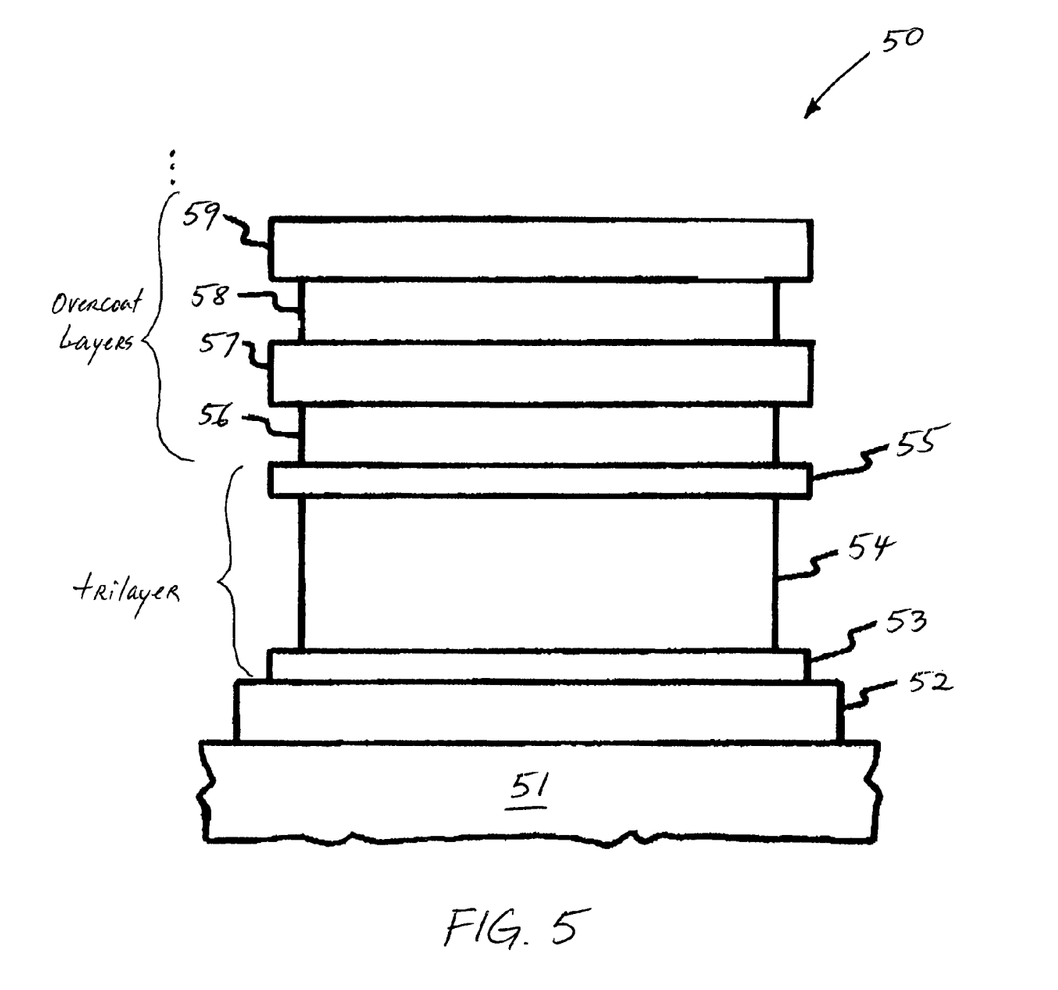
FIG. 5 is a cross-sectional view of an exemplary embodiment of the durable thin-film silver mirror of the present invention.

FIG. 5 shows a cross-section of an illustrative embodiment of the durable thin film silver mirror/multilayer coating of the present invention, generally indicated at reference character 50, and comprising four layered groups: (1) a substrate 51, (2) a high absorptivity metal underlayer 52 as previously described (3) a "trilayer" including the silver layer 54 and adhesion/passivation layers 53, 55, and (4) overcoat layers including layers 56-59. Generally, the metal underlayer (e.g. tungsten) 52 is deposited first on the substrate 51. An adhesion layer 53 is then deposited on the metal underlayer 52. The silver layer 54 is deposited next, and then a passivation layer 55 to form the trilayer. The top layers are durability layers 56, 57, 58, 59 collectively referred as "overcoat layers," comprising a nitride and at least one metal oxide layer. To illustrate using sample materials and thicknesses, an exemplary thin film construction would comprise, in order of deposition: 2000 Å tungsten layer deposited on a substrate; 100-500 Å $NiCrN_x$ layer; 1500 Å silver layer; 3 Å $NiCrN_x$ layer; less than 30 Å $SiN_x$ layer; 600 Å $SiO_2$ layer; 380 Å $TiO_2$ layer; and a plurality (6-10) of $SiO_2/TaO_x$ split layers. Additional details of the trilayer formation used in the present invention are described in U.S. Pat. No. 6,078,425, incorporated by reference herein.

Formation of the trilayer begins with deposition of the adhesion layer 53 which facilitates the adhesion of silver to the metal underlayer 52. The adhesion layer 53 is preferably comprised of nickel or chromium metal, an alloy of nickel and chromium (NiCr), a nitride of nickel or chromium ($NiN_x$, $CrN_x$), or a composite nitride of nickel-chromium ($NiCrN_x$). Since the stoichiometry of the nitride may not be known or is variable, the nitride is denoted as $N_x$. The preferred adhesion layer materials are NiCr alloys and $NiCrN_x$. The proportions or ratio of nickel to chromium by weight (Ni:Cr) in the adhesion layer can vary over the entire range, i.e. all points between 100% Ni to 100% Cr. The selection of the Ni:Cr ratio for NiCr and $NiCrN_x$ is determined by the application of the mirror. Nickel is more chemically inert than chromium and lends greater durability. In addition, nickel forms metallic bonds with the metal underlayer and overlying silver layer. A high ratio (e.g., 80Ni:20Cr) is typically used when environmental durability is important, such as in a desert or marine environment. In contrast, a lower ratio (e.g., 20Ni:80Cr) can be used in space applications, such as telescope mirrors. Another consideration in choosing the Ni:Cr ratio is the absorption of the alloy. The absorption of light by a layer (i.e., 1-(reflectance+transmission)) is a function of the optical constants (index of refraction and extinction coefficient) of the material forming the layer. A NiCr layer with a weight ratio of 80Ni:20Cr has higher absorption than a $NiCrN_x$ film of the same thickness. By changing the ratio of Ni:Cr to 20:80, the absorption of the film is decreased by 1% or more. The thickness of the adhesion layer 53 is typically in the range of about 0.5-5.0 nm if a pure metal or NiCr alloy is used, and about 0.4-1.0 nm if $NiN_x$, $CrN_x$, or $NiCrN_x$ is used. Nickel-chromium nitrides (NiCrN$_x$) can be formed into thin layers, which is advantageous since thin layers absorb less light (and thus have a less adverse effect on reflectance). One preferred embodiment for the adhesion layer is a thin film of NiCrN$_x$ having a thickness of about 0.5-1.0 nm (5-10 Å) and Ni:Cr ratio of about 20Ni:80Cr.

Next the silver layer 54 is formed over the adhesion layer 53. Various deposition methods may be employed, such as magnetron sputtering, E-beam deposition, etc. While sputter-coated silver films are generally considered not to perform as well as E-beam deposited silver, Applicant has determined that by using long throw (i.e. >12 inches) and low pressure (i.e. <1 mTorr) and low power (i.e. <1 kWatt), that silver can be sputter-deposited and provide optical performance (high reflectance) as good as E-beam deposited silver. Thus, in a preferred embodiment, the silver layer is preferably deposited by magnetron sputtering at the lowest pressure and power possible in order to preserve high reflectivity.

Figure 6:
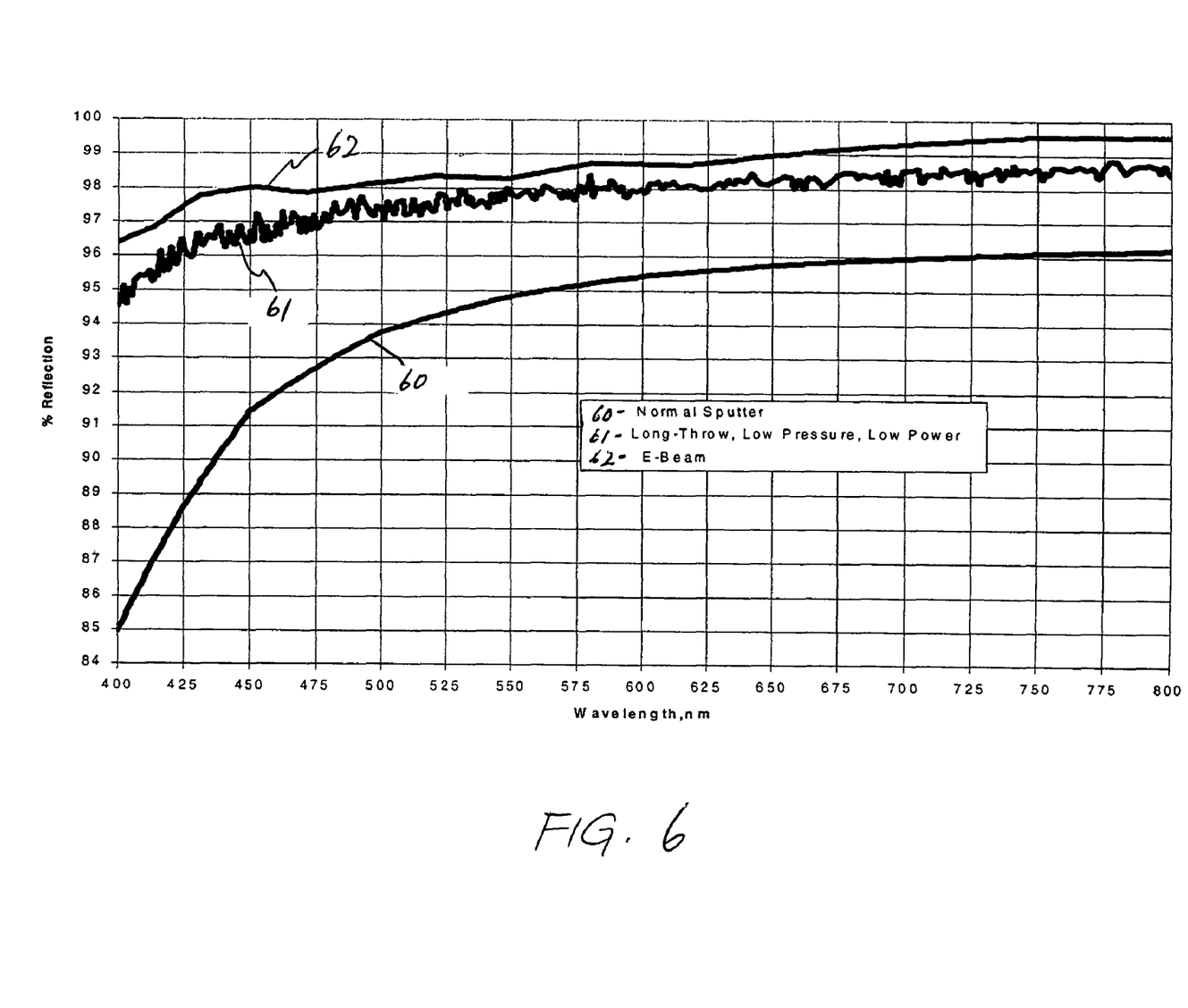
FIG. 6 is a graph showing the percentage reflection of a representative 2600 Å of silver deposited by three different methods: E-beam evaporation, regular DC sputtering, and the long-throw, low pressure, low power magnetron sputtering method of the present invention.

FIG. 6 shows the reflection of an exemplary 2600 Å silver layer deposited by three different methods: E-beam evaporation 62, regular DC sputtering 60, and long-throw, low pressure, low power sputter deposition 61. As can be seen, the long throw, low pressure, low power deposition method 61 closely follows the reflection performance as an E-beam deposited silver layer 62. Typical parameters used for the long throw, low pressure, low power sputtering of high reflecting silver are as follows. The long throw distance is preferably greater than twice the circumference of the target used. For example, for a 6 inch diameter target, greater than 12 inches is preferably used for the source-to-substrate distance. The low pressure parameter is preferably less than 1 mTorr, which is sufficiently low enough to prevent collisions of gas molecules between the target and the substrate (mean free path). For the low power parameter, minimizing power is preferred, such as for example using 100 watts or less for a source-to-substrate distance of 12 inches. And similar to the silver layer 54, the NiCr or NiCrN$_x$ layers (i.e. adhesion and passivation layers 53, 55) may be sputtered onto the metal underlayer 52 using DC magnetron with long throw, low pressure, and low power. Alternatively, these layers can be deposited by chemical vapor deposition, electron beam evaporation, or other techniques known in the art.

Next, the passivation layer 55 is deposited on the silver layer 54 and is formed from the same group of materials as the adhesion layer 53. The adhesion layer 53 and passivation layer 55 in a multilayer may have the same composition, or the two layers may be different. As stated above, changing the ratio of Ni:Cr can increase the durability of the layer (at higher ratios) and decrease the absorption of the layer 18 (at lower ratios). The lower absorption allows more reflection from the silver layer underneath. For a mirror subjected to a particularly harsh environment, it may be advantageous to use a higher Ni:Cr material for the passivation layer 55, which is closer to the top of the multilayer stack (and the environment), while using a lower Ni:Cr material for the adhesion layer 53 underneath. A preferred material for the passivation layer 55 is NiCrN$_x$ having a thickness of about 0.5-1.0 nm (5-10 A). The passivation layer 55 chemically bonds with the silver layer 54 to form an admixture that is not subsequently reactive with environmental contaminants, such as chlorine or sulfur compounds that are frequently found in ambient air. The passivation layer 55 protects the silver layer 54 by physically blocking the migration of contaminating species from the atmosphere to the silver. Contaminating species include chlorine (e.g., HCl, salt fog), water, sulfates (e.g., $H_2SO_4$), sulfur, nitrates, and oxygen in its various forms (e.g. $O_3$).

In addition to the passivation layer 55, the silver layer 54 is mechanically protected from tarnishing by the overcoat layers, such as 56-59. These layers 56-59 act as a barrier to contaminants and provide mechanical stability. The first durability layer 56 is preferably silicon nitride, which may be followed by a series of layers of various metal oxides. The overcoat stack is used for various synergistic functions. In particular, the overcoat layers function as a reflector stack in the 300-350 nm spectrum, which when placed on top of the lower layers increases the reflection to the required values. The overcoat layers also contribute to the mechanical and chemical durability of the overall device. However, the overcoat layers used in the present invention must have a minimum total thickness of 3000 Å in order to pass the abrasion tests. The overcoat layers can consist of any combination of $SiO_2$, $TiO_2$, $Ta_2O_5$, or other materials, but the minimum total thickness of the overcoat must be equal to or greater than 3000 Å. Applicants have determined that the thickness must not be less than 3000 Å in order for the silver mirror design to pass the 20-rub eraser test. Designs with less than 3000 Å of overcoat layers in thickness will have less mechanical resistance (fail the 20 Rub eraser test), but will still pass a 50 cheesecloth test and show good chemical durability.

The first layer 56 of the overcoat layers comprises a nitride. For example, silicon nitride may be selected with the thickness of the silicon nitride film typically in the range of 0-0.3 nm (30 Å). Silicon nitride is a very dense film and provides mechanical strength. If the subsequent metal oxide layers are deposited by sputtering in the presence of oxygen, then the silicon nitride layer is necessary to act as a barrier to the diffusion of atomic oxygen produced in the deposition process. If the oxides are deposited by electron beam evaporation, then the silicon nitride layer is not required since free oxygen is not present to contaminate the silver layer. It is critical to keep oxygen ($O_2$, $O_3$) and its ions ($O^{2-}$) away from the silver layer, since silver reacts with oxygen to form silver oxide, which is less reflective than the silver thin film. The use of a nitride film is preferred, as it permits the subsequent overcoating of metal oxide layers without compromising the pre-existing silver layer.

In an alternative embodiment, the first durability layer 56 may comprise a silicon aluminum nitride (SiAlN$_x$), an aluminum nitride, or two or more alternating layers of silicon nitride and aluminum nitride. The weight ratio of silicon to aluminum (Si:Al) in the composite silicon aluminum nitride can be varied depending on the particular application. For example, aluminum nitride is typically water soluble (unless deposited at high substrate temperatures), and thus would not be used in humid environments. High aluminum content would be favored in a dry environment.

The use of the NiCrN$_x$ passivation layer 55 with the silicon (and/or aluminum) nitride durability layer 56 reduces the reflectance of the overall silver multilayer mirror. This reflectance is recovered to some degree by using standard metal oxide layer techniques to restore the broadband reflectivity. These techniques are widely known in the optical coating industry and are not elaborated here.

Over the first durability layer 56 one or more metal oxides may be formed. Suitable metal oxides include silica ($SiO_2$), alumina ($Al_2O_3$), niobia (NbO$_x$), titania ($TiO_2$), zirconia ($ZrO_2$), tantala ($Ta_2O_5$), and oxides of more than one metal (composite metal oxides), such as tantala hafnia (TaHfO$_x$). Niobium oxide forms a low-stress film and is used in applications for extremely high light intensities since it is inherently more resistant to stress-induced failures. Niobium oxide is also highly resistant to solarizing, or the forming of color centers of displaced lattice atoms. Tantalum-hafnium oxides are particularly advantageous due to a unique combination of beneficial properties: high refractive index and low absorption, especially in the ultraviolet region.

Figure 7:
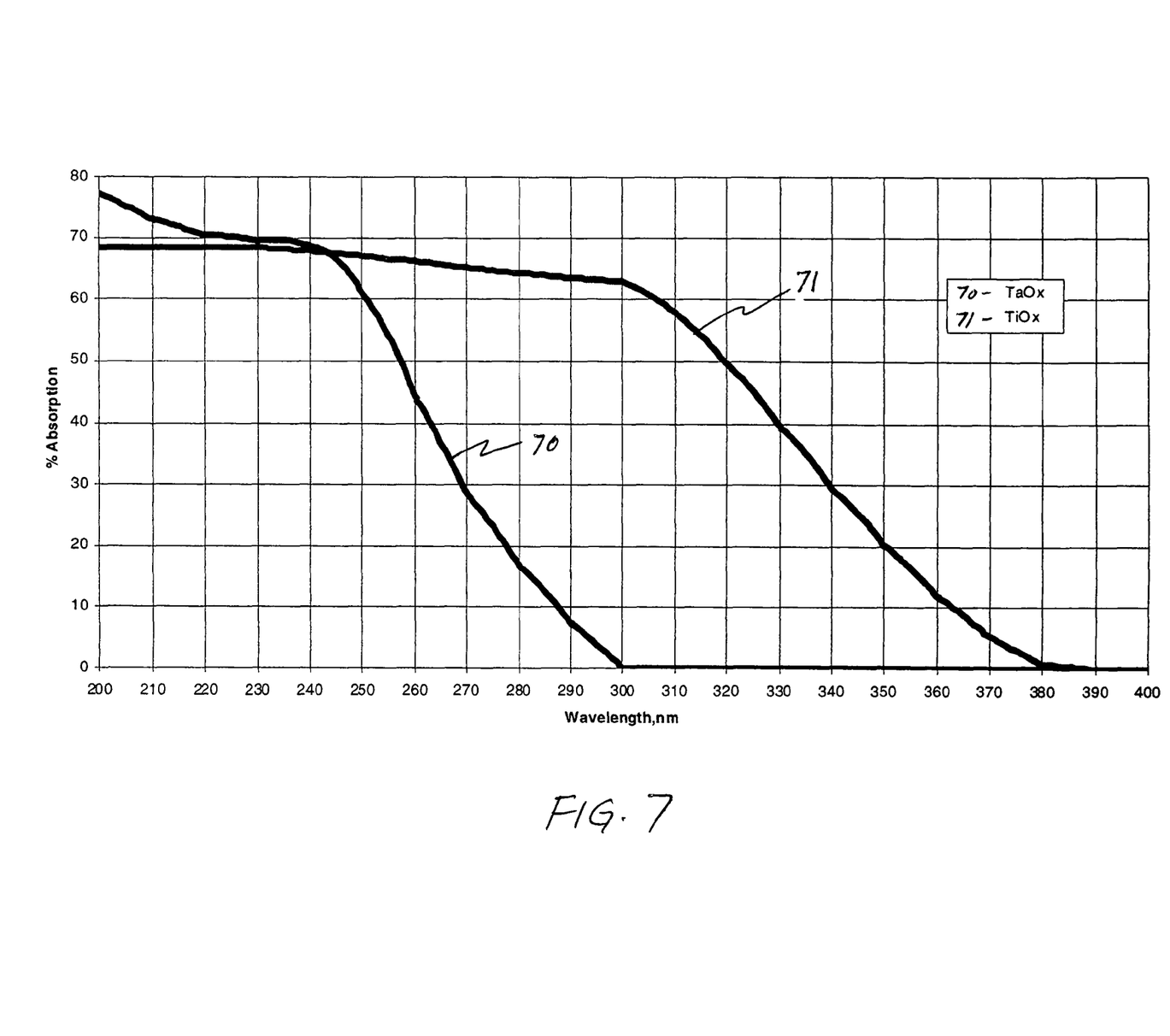
FIG. 7 is a graph showing the percentage absorption of $TiO_x$ versus $TaO_x$ over the wavelength range 200-400 nm.
Figure 8:
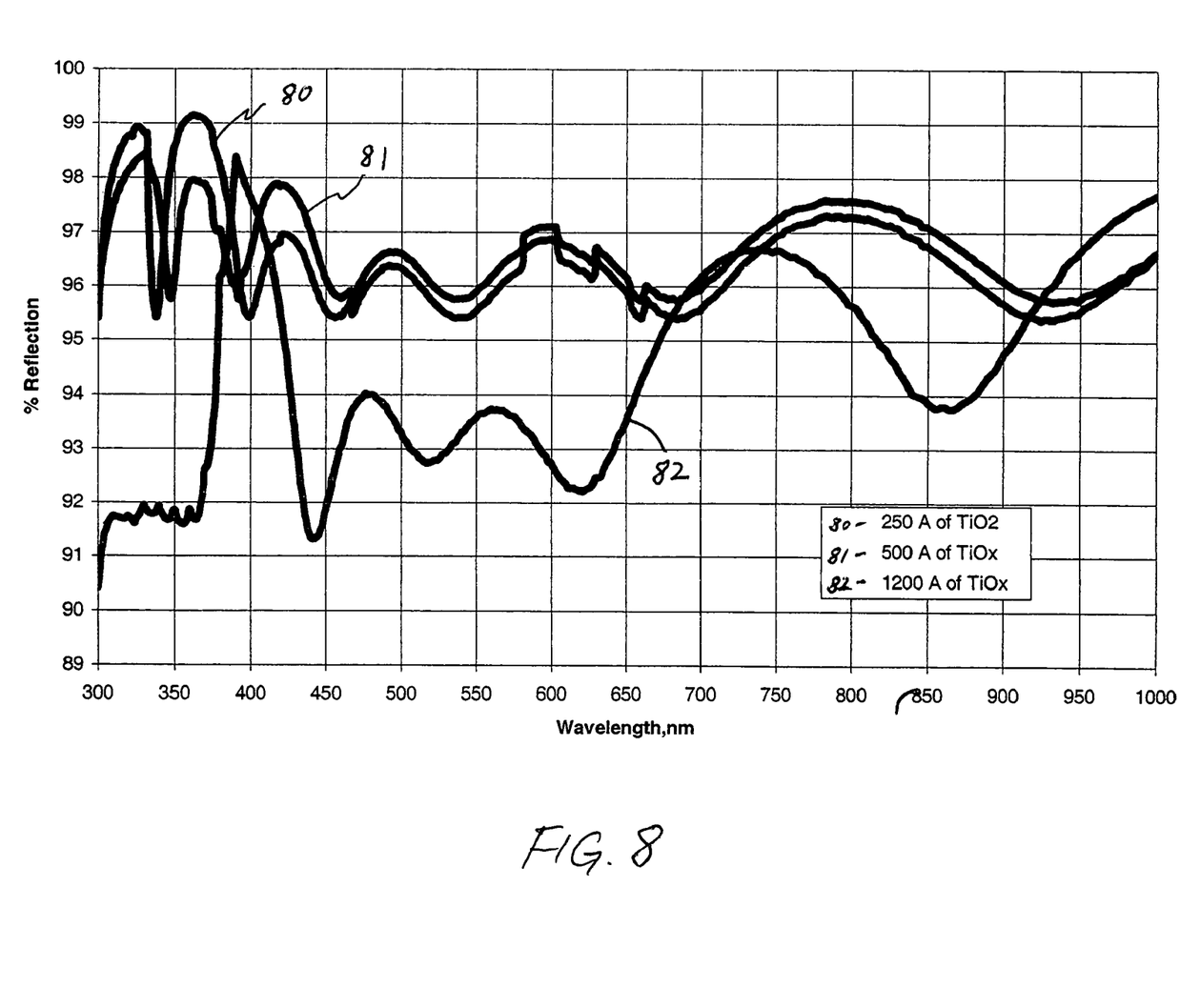
FIG. 8 is a graph showing the percentage reflection of three exemplary embodiments of the present invention having 14 overcoat layers including a combination of $TiO_x/TaO_x$, but with three different $TiO_2$ thicknesses over the wavelength range 300-1000 nm.

$TiO_2$ in particular is typically not used in thin film design because it is very absorbing below about 400 nm, and is therefore ordinarily not used in designs intended for operation in the 300-400 nm wavelength range. However, one preferred embodiment utilizes $TiO_2$ in conjunction with $Ta_2O_5$ (split layers) where the total thickness of this layer is kept below 1000 Å. FIG. 7 shows the absorption of 700 Å thick samples of $TiO_x$ 70 versus $TaO_x$ 71 on a fused silica substrate. The graph shows that $TiO_x$ 70 has large amounts of absorption below 400 nm and for this reason it is not normally used as a reflective material in this region. In contrast, the absorption of $TaO_x$ 71 does not start until below 300 nm. FIG. 8 illustrates the effect of using a split layer combination of $TiO_x/TaO_x$ in an exemplary 14 layer design having three representative thicknesses: 250 Å of $TiO_2$ at 80, 500 Å of $TiO_x$ at 81, and 1200 Å of $TiO_x$ at 82. As shown in FIG. 8, the use of $TiO_x$ in the durable silver mirror design allows just 14 layers to be used which will meet the spectral performance of greater than 95% average reflection from 300-2500 nm. It also shows the effect of using more than 950 Å of $TiO_x$ in the design. Because of the absorption of $TiO_x$, the overall reflection across the wavelength of interest is degraded well below 93% if more than 900 Å of $TiO_x$ is used in the design, and illustrated by 82.

Figure 9:
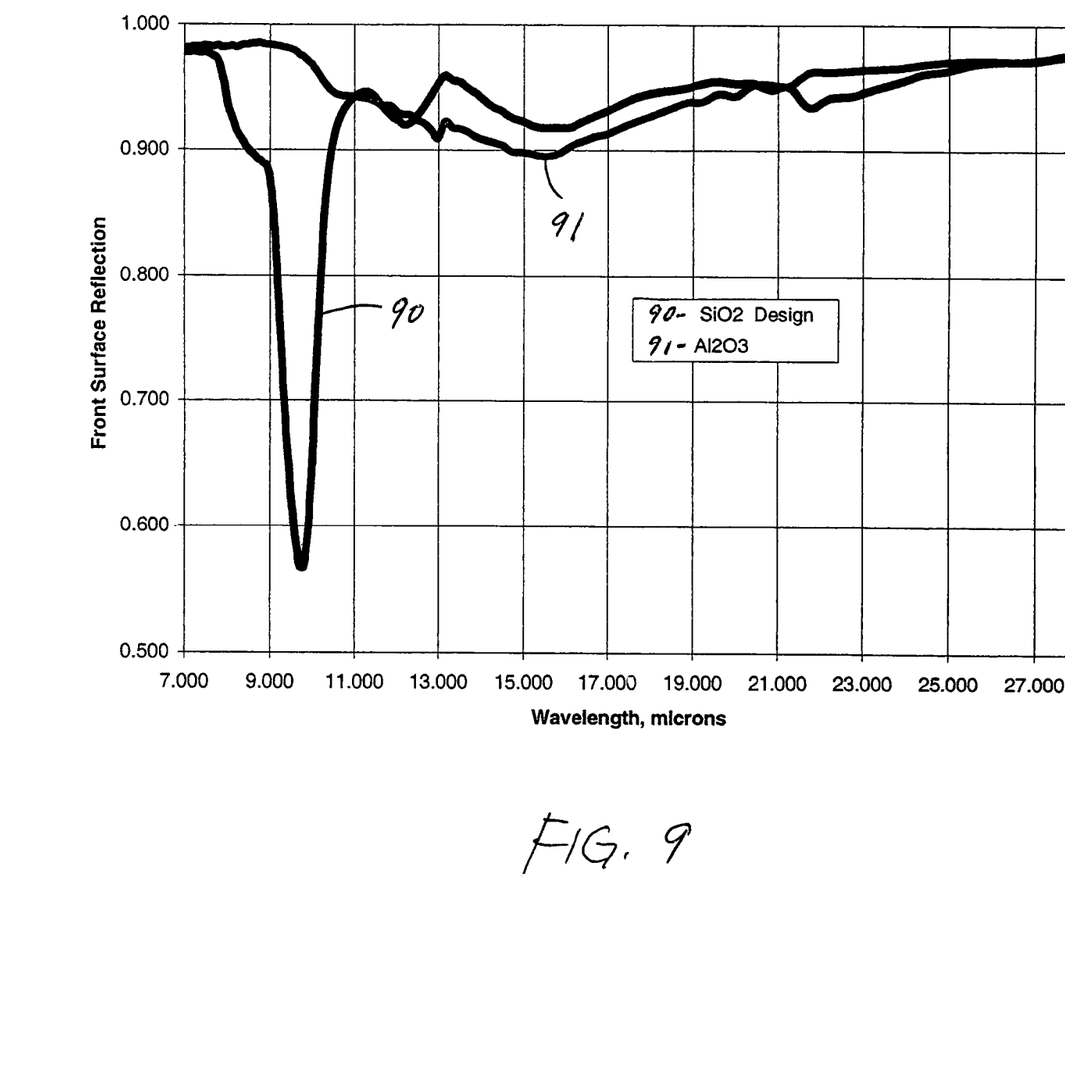
FIG. 9 is a graph showing the percentage reflection from actual scans of two embodiments of the present invention using $SiO_2$ or $Al_2O_3$ over the wavelength range 7 to 27 microns.

The material $SiO_2$ has absorption band in the infra-red portion of the spectrum from about 8-12 microns. Thus for certain applications (astronomical) requiring a mirror having high reflectance across the entire spectrum from 300 nm in the UV to 50 microns in the far infra-red, $SiO_2$ may be substituted with aluminum oxide $Al_2O_3$ if kept below 6000 Å total thickness. FIG. 9 shows a graph of actual scans showing the reflection of 18 layer mirror designs using $Al_2O_3$ at 91 versus $SiO_2$ at 90, as the low index material, and showing the absorption band in the $SiO_2$.

Figure 10:
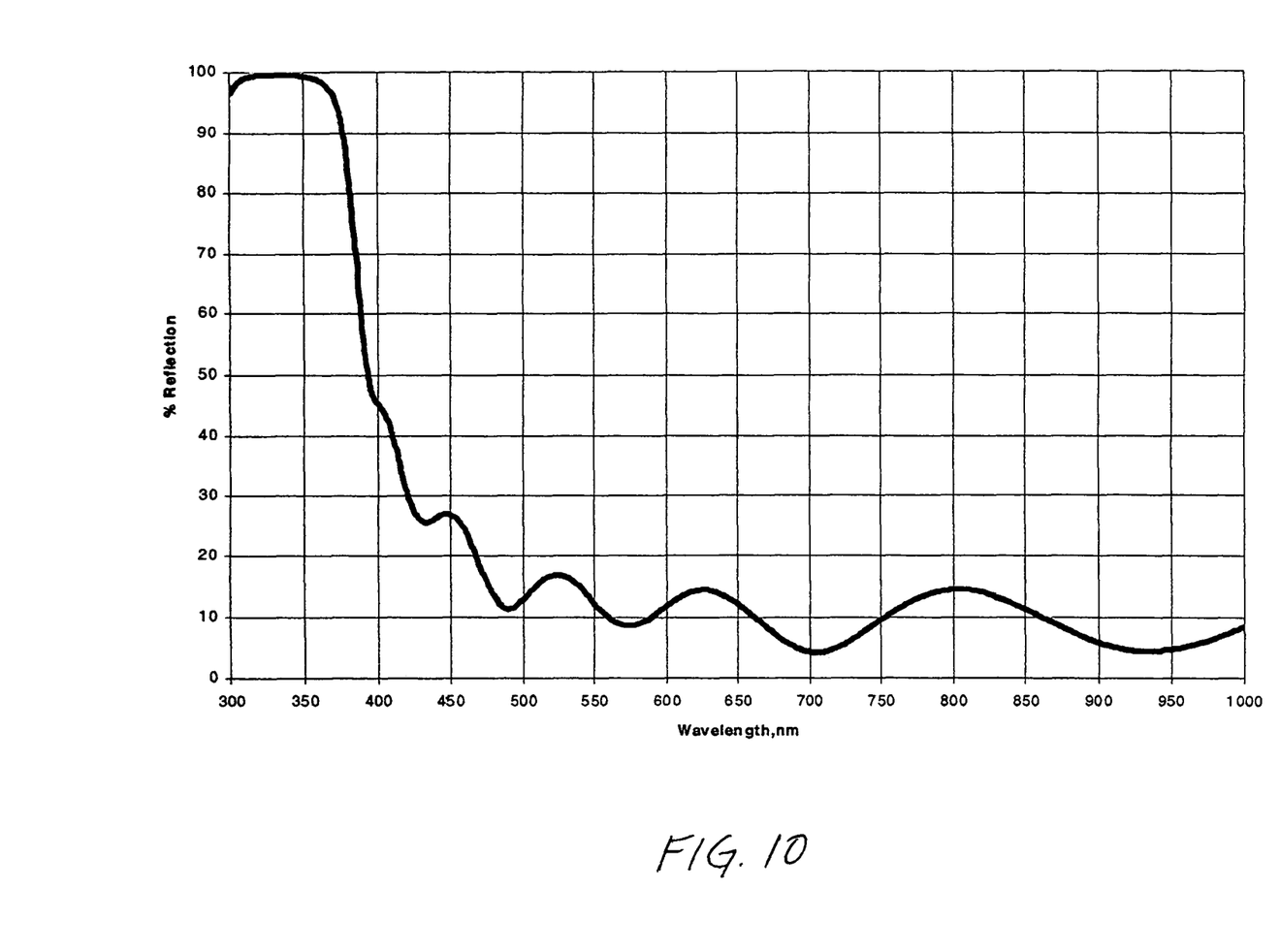
FIG. 10 is a graph showing the percentage reflection of only the overcoat layers of the present invention, without the $NiCrN_x$ and silver layers, over the wavelength range 300-1000 nm.

The overcoat layers formed using the nitride and metal oxide layer combinations described above, enable the durable silver mirror of the present invention to achieve high reflectance in the 300-400 nm low reflectance gap range of silver, while also contributing to the mechanical and chemical durability of the overall device. As previously discussed, the overcoat layers function as a reflector stack in the 300-350 nm spectrum, which when placed on top of the lower layers increases the reflection to the required values. As shown in FIG. 10, the percentage reflection of only the overcoat layers of the present invention in near 100% in the range from 300-350 nm.

Figure 11:
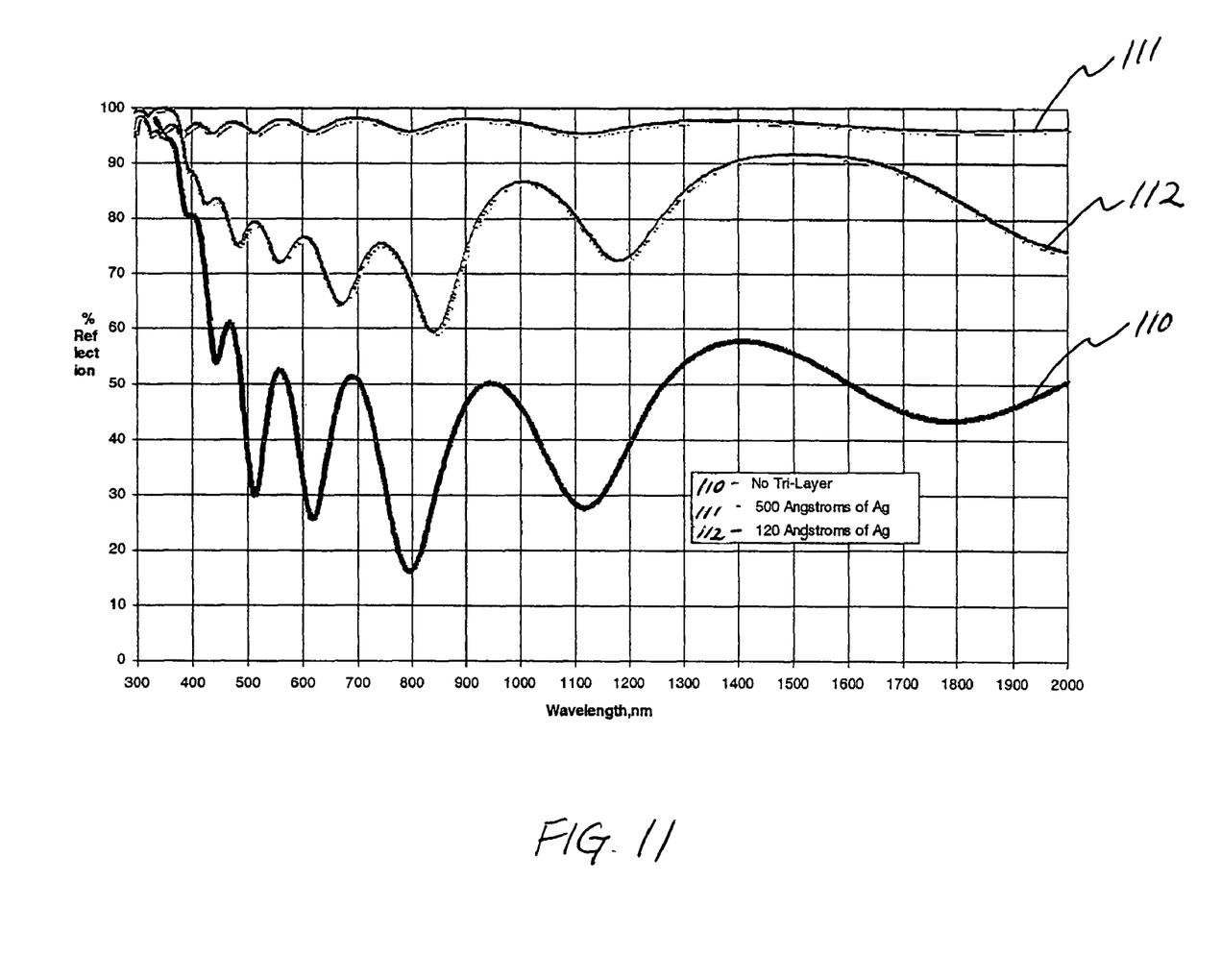
FIG. 11 is a graph showing the percentage reflection of an exemplary embodiment of the present invention having various combinations of a tungsten underlayer, overcoat layers, and a trilayer having a silver layer sandwiched between, for example, $NiCrN_x$.

Thin film multilayer silver mirrors of the present invention, such as shown in FIG. 5, have been made and tested, resulting in scratch-resistant and atmospherically tarnish-resistant mirrors. The performance of the durable silver mirror is shown in FIG. 10 showing the graph of an exemplary embodiment of the present invention using, for example, a 2000 Å layer of tungsten (W) as the metal underlayer and overcoat layers previously described. In particular FIG. 10 compares the percentage reflectance of (1) the 2000 Å tungsten layer plus overcoat layers without a silver layer, indicated at 110, the 2000 Å tungsten layer plus overcoat layers with a 120 Å silver layer, indicated at 112, and the 2000 Å tungsten layer plus overcoat layers with a 500 Å silver layer, indicated at 111. FIG. 11 shows that if a 2000 Å layer is used as the first layer on the substrate, then even a 500 Å thick layer of silver combined with the overcoat layers will allow the device to function with better than 95% average reflection from 300-2500 nm. This is contrary to and an improvement over the known reflectance, absorption, and transmission characteristics of silver previously discussed. Furthermore, a minimum of 12-14 overcoat layers is required to achieve >95% reflection from 300-2500 nm. If it is desired to reflect only the visible portion and higher (i.e. >400 nm) the design of the durable silver mirror can have as few as 4 overcoat layers and still meet 95% average reflection from 400-1000 nm.

The foregoing description of preferred embodiments of the invention is presented for purposes of illustration and description and is not intended to be exhaustive or to limit the invention to the precise form disclosed. Modifications and changes may become apparent to those skilled in the art, and it is intended that the invention be limited only by the scope of the appended claims.

I claim:

1. A reflective mirror having high reflectance over a large spectral range, comprising:
    a substrate comprising an absorbent non-aluminum metal layer on at least a surface thereof, said absorbent non-aluminum metal layer comprising at least one of tungsten, tantalum, nickel, chromium, and alloys thereof;
    an adhesion layer deposited directly on the absorbent non-aluminum metal layer, said adhesion layer comprising a material selected from the group consisting of nickel, nickel nitride, chromium, chromium nitride, nickel-chromium alloys, and nickel-chromium nitride;
    a reflective silver layer deposited on the adhesion layer so that light transmitted through the silver layer is absorbed by the absorbent non-aluminum metal layer to increase the reflection of the silver layer at all wavelengths;
    a passivation layer deposited on the silver layer, comprising a material selected from the group consisting of nickel, nickel nitride, chromium, chromium nitride, nickel-chromium alloys, and nickel-chromium nitride;
    a nitride layer deposited on the passivation layer; and
    a plurality stack of metal oxide layers deposited on the nitride layer.

2. The reflective mirror of claim 1,
    wherein the absorbent metal layer has a thickness in the range of about 800-2000 Å.

3. The reflective mirror of claim 1,
    wherein the silver layer has a thickness in the range of about 500-1500 Å.

4. The reflective mirror of claim 1,
    wherein the nitride layer and the plurality stack of metal oxide layers have a combined thickness of at least about 3000 Å.

5. The reflective mirror of claim 1,
    wherein the nitride layer is selected from the group consisting of $SiN_x$ and $AlN_x$.

6. The reflective mirror of claim 5,
    wherein the nitride layer is $SiN_x$ having a thickness less than 30 Å.

7. The reflective mirror of claim 1,
    wherein the plurality stack of metal oxide layers includes:
        a first metal oxide layer selected from the group consisting of $SiO_2$ and $Al_2O_3$ deposited on the nitride layer;
        a plurality of TaOx/TiOx split layers deposited on the first metal oxide layer; and
        a last metal oxide layer deposited on the plurality of TaOx/TiOx split layers.

8. The reflective mirror of claim 7,
    wherein the plurality of split layers include about 10 split layers.

9. The reflective mirror of claim 7,
    wherein the nitride layer and the plurality stack of metal oxide layers including each of the TaOx layers individually and each of the TiOx layers individually, comprise about four layers so as to achieve greater than 95% reflection in the wavelength range of about 400-1000 nm.

10. The reflective mirror of claim 7, wherein the nitride layer and the plurality stack of metal oxide layers including each of the TaOx layers individually and each of the TiOx layers individually, comprise about fourteen layers so as to achieve greater than 95% reflection in the wavelength range of about 300-2500 nm.

11. A reflective mirror having high reflectance over a large spectral range, comprising:
a substrate;
a reflective coating deposited on the substrate;
a nitride layer on the reflective coating; and
a plurality stack of metal oxide layers deposited on the nitride layer, said plurality stack of metal oxide layers including: a first metal oxide layer selected from the group consisting of $SiO_2$ and $Al_2O_3$ deposited on the nitride layer; a plurality of TaOx/TiOx split layers deposited on the first metal oxide layer; and
a last metal oxide layer deposited on the plurality of TaOx/TiOx split layers.

12. The reflective mirror of claim 11, wherein the plurality of split layers include about 10 split layers.

13. A method for forming a reflective mirror having high reflectance over a large spectral range, comprising:
providing a substrate comprising an absorbent non-aluminum metal layer on at least a surface thereof, said absorbent non-aluminum metal layer comprising at least one of tungsten, tantalum, nickel, chromium, and alloys thereof;
forming an adhesion layer directly on the absorbent non-aluminum metal layer, said adhesion layer comprising a material selected from the group consisting of nickel, nickel nitride, chromium, chromium nitride, nickel-chromium alloys, and nickel-chromium nitride;
forming a reflective silver layer on the adhesion layer so that light transmitted through the silver layer is absorbed by the absorbent non-aluminum metal layer to increase the reflection of the silver layer at all wavelengths; and;
forming a passivation layer on the silver layer, comprising a material selected from the group consisting of nickel, nickel nitride, chromium, chromium nitride, nickel-chromium alloys, and nickel-chromium nitride;
forming a nitride layer on the passivation layer; and
forming a plurality stack of metal oxide layers on the nitride layer.

* * * * *